US012227969B2

(12) United States Patent
Geringer

(10) Patent No.: US 12,227,969 B2
(45) Date of Patent: Feb. 18, 2025

(54) DOOR LATCH LOCKING MECHANISM

(71) Applicant: 1 ADOLFO, LLC, Camarillo, CA (US)

(72) Inventor: David Geringer, Camarillo, CA (US)

(73) Assignee: Security Door Controls, Camarillo, CA (US)

( * ) Notice: Subject to any disclaimer, the term of this patent is extended or adjusted under 35 U.S.C. 154(b) by 83 days.

(21) Appl. No.: 16/122,775

(22) Filed: Sep. 5, 2018

(65) Prior Publication Data

US 2019/0071894 A1 Mar. 7, 2019

Related U.S. Application Data

(60) Provisional application No. 62/554,480, filed on Sep. 5, 2017.

(51) Int. Cl.
*E05B 65/08* (2006.01)
*E05B 47/00* (2006.01)
*E05B 65/00* (2006.01)

(52) U.S. Cl.
CPC ...... *E05B 47/0012* (2013.01); *E05B 65/0007* (2013.01); *E05B 65/08* (2013.01); *E05Y 2201/20* (2013.01)

(58) Field of Classification Search
CPC ..... E05C 3/24; E05C 3/12; E05C 3/30; E05Y 2201/20; E05B 47/0012; E05B 65/0007; E05B 65/08; E05B 65/0864; E05B 65/0811; E05B 65/0835; E05B 65/0841; E05B 65/0847; E05B 65/0852; E05B 67/383; E05B 63/12; E05B 63/0013; E05B 63/121; E05B 63/122; E05B 63/123; E05B 63/124; E05B 63/125; E05B 63/126; E05B 63/127; E05B 63/128; E05B 55/005
USPC ... 70/95–100, 135–139, 141, 142, 144, 145; 292/340, 341.17
See application file for complete search history.

(56) References Cited

U.S. PATENT DOCUMENTS 1,768,021 A * 6/1930 Bauerband .......... E05B 47/0002 70/282
3,904,229 A * 9/1975 Waldo .................. E05B 65/087 292/29
3,919,869 A * 11/1975 Fromm ............. G07C 9/00722 70/263
4,824,151 A * 4/1989 Taylor ................ E05B 47/0002 292/153
5,492,382 A * 2/1996 McBride ............ E05B 47/0002 292/201
6,192,723 B1 * 2/2001 Brownell, Sr. ..... E05B 47/0002 292/144

* cited by examiner

*Primary Examiner* — Suzanne L Barrett
(74) *Attorney, Agent, or Firm* — Jaye G. Heybl; Stradling Yocca Carlson & Rauth

(57) ABSTRACT

The present disclosure describes locking mechanisms comprising a locking component and a latching component. The locking component is within or otherwise connected to a first structure, such as a sliding door, and the latching component is within or connected to a second structure, such as a door jam. The latching component comprises a latch structure comprising features that can accept a portion of the locking component to lock the first structure to the second structure. In some embodiments, the latching component comprises a recess within the latching component. In some embodiments, the locking component comprises a rotating engagement structure configured to engage the latching component.

13 Claims, 4 Drawing Sheets

DOOR LATCH LOCKING MECHANISM

CROSS REFERENCE TO RELATED APPLICATIONS

This application claims the benefit of U.S. Provisional Patent Application Ser. No. 62/554,480, filed on Sep. 5, 2017, to David Geringer, entitled DOOR LATCH LOCKING MECHANISM, which is hereby incorporated herein in its entirety by reference.

BACKGROUND

Field of the Invention

The present invention relates to door locks comprising latch mechanisms, and in particular, to door locks with latch mechanisms comprising locking features or features for engaging locking mechanisms.

Description of the Related Art

Security doors to prevent theft or vandalism have evolved over the years from simple doors with heavy duty locks to more sophisticated egress and access control devices. Hardware and systems for limiting and controlling egress and access through doors are generally utilized for theft-prevention or to establish a secured area into which (or from which) entry is limited. For example, retail stores use such secured doors in certain departments (such as, for example, the automotive department) which may not always be manned to prevent thieves from escaping through the door with valuable merchandise. In addition, industrial companies also use such secured exit doors to prevent pilferage of valuable equipment and merchandise.

One type of door that can benefit from security features is the sliding door and various gates that also operate similarly. However, due to these doors opening through sliding horizontal movement rather than swinging open, typical electronic security latches used for typical doors are not as effective. Furthermore, relying solely on typical electronic features, with minimal mechanical locking features, in sliding security doors can be costly.

SUMMARY

Described herein are locks for security doors that are particularly useful for sliding doors and gates. These locks can comprise both mechanical and electronic control features and mechanical latching features.

In some embodiments, locks incorporating features of the present invention can comprise a locking component and a latching component. In some embodiments, the latching component itself comprises features for engaging or interacting with the locking component. In some embodiments, the latching component comprises a recess configured to accept a portion of the locking component within the recess.

In one embodiment, a locking mechanism, comprises a latching component comprising a solid latch structure and a locking component comprising a cavity configured to receive the solid latch structure. The locking component further comprises a latch-engaging portion configured to transition between a position wherein the latch-engaging portion engages the solid latch structure within the cavity and holds the solid latch structure within said cavity and another position wherein the latch-engaging portion does not engage the solid latch structure.

In another embodiment, a locking mechanism, comprises a latching component comprising a solid latch structure which comprises a receptacle portion, and further comprises a locking component. The locking component comprises a latch-engaging portion configured to transition between a position wherein a portion of the latch-engaging portion engages the receptacle portion of the solid latch structure and connects the solid latch structure to the latch-engaging portion and another position wherein the latch-engaging portion does not engage the receptacle portion of the solid latch structure.

In yet another embodiment, a locking mechanism comprises a latching component comprising a solid latch structure, which comprises a receptacle portion, and further comprises a locking component. The locking component comprises a cavity configured to receive the solid latch structure and the locking component further comprises a latch-engaging portion configured to transition between a position wherein a portion of the latch-engaging portion engages the receptacle portion of the solid latch structure and holds the solid latch structure within the cavity and another position wherein the latch-engaging portion does not engage said receptacle portion.

These and other features and advantages of the invention will be apparent to those skilled in the art from the following detailed description, taken together with the accompanying drawings.

DETAILED DESCRIPTION

Figure 1:
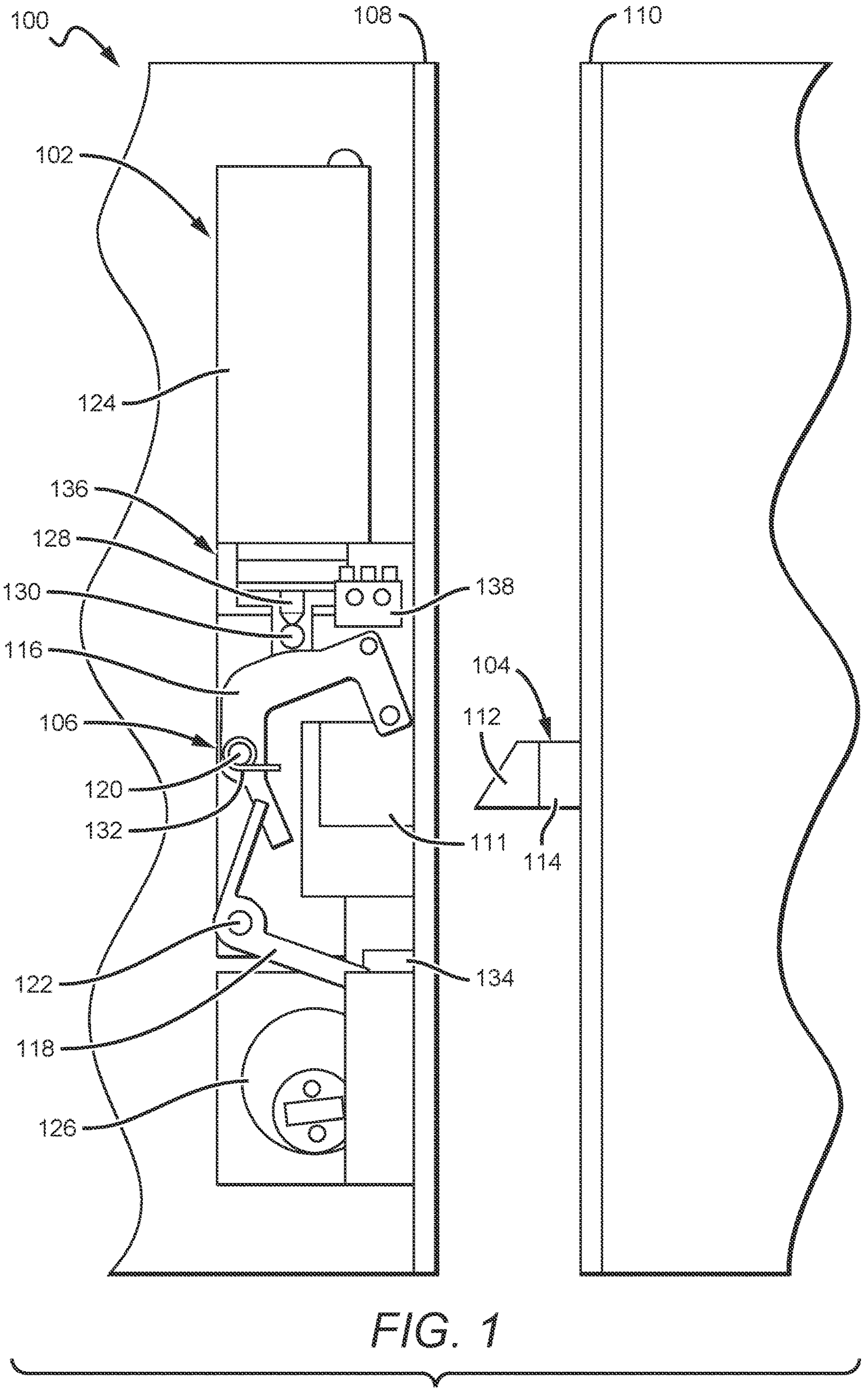
FIG. 1 is a front sectional view of an embodiment of a lock shown in its "unlocked" configuration, incorporating features of the present invention.

The present invention is directed to locking mechanisms incorporating one or more locking components and one or more latching components. The latching components can comprise a receptacle portion for engaging one or more portions of the locking component. In some embodiments, the locks are configured to connect a first structure to a second structure so that the first structure can be locked to, or unlocked from, the second structure. In some embodiments, the locking component is within or otherwise connected to the first structure and the latching component is within or otherwise connected to the second structure. In other embodiments, the locking component is within or otherwise connected to the second structure and the latching component is within or otherwise connected to the first structure.

In some embodiments, the latching component comprises a solid door latch structure with a receptacle portion therein configured to accept a portion of a locking structure of the locking component. In some embodiments, the receptacle portion is a recess or pocket. In some embodiments, the recess extends throughout the entire thickness of the latch structure. In some embodiments, the recess extends only partially through the entire thickness of the latch structure.

In some embodiments, the locking structure of the locking component can comprise on or more latch-engaging portions configured to engage the latching component, for example, by moving in or out of the receptacle portion of the latching component. In some embodiments, the locking structure of the locking component can comprise one or more auxiliary-access portions, allowing for additional control over the locking component. For example, in some embodiments, the latch-engaging portions can be controlled via a solenoid or other actuator, which can be configured to push or pull (mechanically or through use of magnetic force) on the latch-engaging portion, while the auxiliary-access portions can be controlled manually, for example, via a key cylinder. In some embodiments, an auxiliary-access portion is configured to mechanically push or pull on a portion of a latch-engaging portion, such that movement of the auxiliary-access portion translates to movement of the latch-engaging portion. In some embodiments, the locking structure comprises a structure comprising a cavity, for example, a locking mechanism mounting body comprising a cavity configured to accept the latching component.

The embodiments herein are described with reference to a particular lock, but it should be understood that the inventions can be similarly used in other types of locks and other devices unrelated to locks. The components described herein can have many different shapes and sizes beyond those shown and can be arranged in many different ways beyond those described herein.

The present invention is described herein with reference to certain embodiments, but it is understood that the invention can be embodied in many different forms and should not be construed as limited to the embodiments set forth herein. In particular, the present invention is described below in regards to a mortise lock, but it is understood that the present invention can be used for many other locks with other configurations. The locks can also have many different shapes beyond those described herein and the internal components can be arranged in many different ways. In other embodiments, the components shown internal to the lock can be arranged external to the lock.

It is also understood that when a feature or element may be referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one layer or another region. It is understood that these terms are intended to encompass different orientations of the lock features beyond those shown in the figures.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Embodiments of the invention are described herein with reference to cross-sectional view illustrations that are schematic illustrations of embodiments of the invention. As such, the actual thickness of the layers can be different, and variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing. A region illustrated or described as square or rectangular will typically have rounded or curved features due to normal manufacturing tolerances. Thus, the regions illustrated in the figures are schematic in nature and their shapes are not intended to illustrate the precise shape of a region of a device and are not intended to limit the scope of the invention.

An embodiment of a lock 100 incorporating features of the present invention is shown in FIG. 1, shown as an "unlocked" configuration. In some embodiments, the lock 100 can comprise a locking component 102 and a latching component 104. The locking component 102, the latching component 104, and the individual elements of the two components 102, 104, can comprise any material capable of performing the functions described herein, with the preferred material being a durable material, such as a metal. Some example materials the lock 100 can comprise, but are not limited to: a resin, rubber, vinyl, polyurethane, poly vinyl chloride (PVC), Poly(methylmethacrylate) (PMMA), polymers/copolymer substances, acrylic substances, plastic, metal, glass, fiberglass, or a combination thereof.

The locking component 102 can comprise at least one locking structure 106 that is configured to interact with, or mate with, one or more portions of the latching component 104 so as to "lock" or "unlock" a first structure 108 connected to the locking component 102 to a second structure 110 connected to the latching component 104. In some embodiments, the first structure 108 is a door and the second structure 110 is a door jamb. In the embodiment shown, the locking component 102 is connected to the first structure 108 by being at least partially housed within the first structure 108 and the latching component 104 is connected to the second structure 110 by being at least partially housed within the second structure 110.

In some embodiments, the locking component 102 is not within a door structure and the latching component 104 is not within a door jamb structure. For example, in some embodiments, the locking component 102 can be within a door jamb structure and the latching component 104 is within the door structure. Furthermore, locking structures 100 incorporating features of the present invention can be utilized to connect other types of structures, such that the first structure 108, which houses or is otherwise connected to the locking component 102 or the latching component 104, is connected to a second structure 110. In these embodiments, the second structure 110 houses or is connected to the other one of the locking component 102 or latching component 104 not housed or connected to the first structure 108, such that the first structure 108 can be locked to or unlocked from the second structure 110 as described herein. Although locking structures 100 incorporating features of the present invention are particularly useful for doors, they can be utilized with other structures, including, but not limited to, gates, cabinets, chests, and drawers.

The locking structure 106 of the locking component 102 can interact with a portion of the latching component 104 so as to hold the latching component in a "locked" or "latched" position, for example, holding at least a portion of the latching component 104 within a cavity 111 within the locking component 102 that is configured to receive at least a portion of the latching component 104. In some embodiments, including the embodiment shown in FIG. 1, the latching component 104 comprises a solid latch structure 112 comprising a receptacle portion 114, which is configured to receive at least a portion of the locking structure 106, so to connect the locking component 102 to the latching component 104, and therefore, to connect the first structure 108 to the second structure 110 in a "locked" configuration. When the locking structure 106 is engaged with the receptacle portion 114 of the solid latch structure 112, it is not readily possible to disconnect the first structure 108 from the second structure 110, without first removing the locking structure 106 from the receptacle portion 114 of the solid latch structure 112.

The receptacle portion 114 of the latch structure 112 can comprise many different configurations to facilitate connection of the locking structure 106 of the locking component 102 to the solid latch structure 112. Examples of various receptacle portion configurations include connection features such as magnetic features, male-female connection structures, hooks, snap fit features, recessed portions, combinations thereof or any connection structure known in the art.

In some embodiments, such as the embodiment shown in FIG. 1, the receptacle portion 114 comprises a recess or pocket (such as a hole, hollow or omitted portion, recessed portion, or indented portion of the solid latch structure 112) and at least a portion of the locking component 102 is configured to fit within this recess. This recess 114 can comprise a recess that extends through the entire thickness of the solid latch structure 112, such as is shown in FIG. 1, can extend through substantially the entire thickness, or can extend partially through the thickness of the solid latch structure 112. Of note is that FIG. 1 is a sectional view and therefore it may appear that the recess 114 is not substantially surrounded by sidewalls of the solid latch structure 112. While in some embodiments, this may be the case, in some preferred embodiments, the recess 114 extends at least partially through the thickness of the solid latch structure 112, without omitting the sidewall portions, resulting in a recess 114 that is substantially surrounded by the solid portions of the solid latch structure 112. The surrounding solid portions of the solid latch structure 112 can be better seen in the perspective view of FIG. 4.

In embodiments wherein the recess 114 extends through the entire thickness of the solid latch structure 112, the recess 114 can be surrounded on all side portions, or substantially on all side portions, by solid portions of the latch structure. In embodiments wherein the recess 114 extends through less than the entire thickness of the solid latch structure 112, the recess 114 can be substantially surrounded on all sides and on a portion of the bottom by solid portions of the solid latch structure 112. In some embodiments, the recess is specifically shaped or sized to comprise a form fit with a corresponding portion of the locking structure 106. In other embodiments, the recess 114 may be larger than the portion of the locking structure 106.

The locking structure 106 can comprise one or more specialized portions to provide different functions. For example, the locking structure 106 can comprise one or more latch-engaging portions 116, which can be the portion of the locking structure 106 that engages with the latching component 104, such as by fitting into the recess 114. The locking structure 106 can also further comprise an auxiliary-access portion 118, which can be configured to interact with an additional structure, which will cause movement of the auxiliary-access portion 118, which will in turn cause movement of the latch-engaging portion 116, so as to transition the lock 100 from a "locked" state where the latch-engaging portion 116 is engaged with the latching component 104, to an "unlocked" state, where the latch-engaging portion 116 is not engaged with the latching component 104.

In some embodiments, including the embodiment shown in FIG. 1, it is the latch-engaging portion 116 of the locking structure 106 that is configured to engage or interact with the latching component 104, for example, by moving into a position within the recess 114 (locking) or to a position outside of the recess 114 (unlocking). While the present disclosure includes any structural configuration enabling the latch-engaging portion 116 to change position to engage and disengage from latching component 104, the embodiment in FIG. 1 shows a rotational configuration, wherein the latch-engaging portion 116 can rotate about a latch-engaging portion pivot axis 120 to raise or lower to engage or disengage from the recess 114 of the latching component 104. Furthermore, the present disclosure includes alternate configurations wherein the cavity 111 is configured to receive the latch structure 112 and the latch-engaging portion 116 is configured to engage the latch structure 112 securely held within the cavity 111 such that movement of the structures 108, 110 is prevented. Examples of such additional configurations include, but are not limited to, a magnetized latch-engaging portion 116 that holds the latch structure 112 within the cavity 111 and a portion of the latch-engaging portion 116 comprising a clamp-like portion that that holds the latch structure 112 within the cavity 111.

In some embodiments, the latch-engaging portion 116 comprises a hole-portion and its latch-engaging portion pivot axis 120 is provided by a cylinder or a dowel structure through the hole-portion, although other moveable connections are possible, for example, a ball and socket joint arrangement, a hinge or living hinge arrangement, and a vertical and or horizontal rotational movement arrangement or any known moveable connection configuration.

Likewise, the auxiliary-access portion 118 can comprise any structural configuration enabling movement, which can then translate into movement of the latch-engaging portion 116. In the embodiment shown, the auxiliary-access portion 118 can rotate about an auxiliary-access portion pivot access 122 in a manner similar to how the latch-engaging portion 116 can rotate about a latch-engaging portion pivot axis 120.

The auxiliary-access portion 118 can be connected to the latch-engaging portion 116, such that movement of the auxiliary-access portion 118 can cause movement of the latch-engaging portion 116. In some embodiments, the auxiliary-access portion 118 is connected to the latch-engaging portion 116 mechanically, such that movement of the auxiliary-access portion 118, causes a portion of the auxiliary-access portion 118 to push or pull against a portion of the latch-engaging portion 116, either directly or through one or more intervening structures, causing the desired movement of latch-engaging portion 116. In some embodiments, movement of the auxiliary-access portion 118 can cause an electronic signal to be sent to a mechanism that moves the latch-engaging portion 116, for example, having movement of the auxiliary-access portion 118 trigger a switch, cutting or providing electrical power to a mechanism that moves the latch-engaging portion 116.

An advantage of utilizing a locking structure 106 comprising both the latch-engaging portion 116 and the auxiliary-access portion 118, is that the locking mechanism can be controlled through multiple mechanisms, including a mechanism acting upon the latch-engaging portion 116 itself, and a mechanism indirectly controlling the latch-engaging portion 116 by acting on the auxiliary-access portion 118, which can then translate into motion of the latch-engaging portion 116. For example, as shown in FIG. 1, an actuator 124 is connected to the latch-engaging portion 116 and a manual locking cylinder 126 is connected to the auxiliary-access portion 118. This configuration allows for two ways of transiting the lock 100 to and from locked and unlocked states, manually through activating the locking cylinder 126 or electronically, by activating the actuator 124.

The actuator 124 can comprise many different actuator configurations, such as different motors or solenoids, with the embodiment shown comprising a solenoid. The elements and operation of solenoids is generally known in the art and is not discussed in detail herein. Many different solenoids can be used in the lock including single or multiple stage coils that are operable with different voltages, for example, 12 or 24 volts.

In some embodiments, the actuator 124 can comprise a motor configured with a threaded lead screw with the threads cooperating with other features on the motor to cause motion. In the embodiment shown in FIG. 1, the actuator 124 is a solenoid configured with a plunger 128 and a ball-element 130, which acts as a ball bearing to reduce friction when the plunger 128 interacts with the latch-engaging portion 116. Electronic operation of the solenoid, which can be accomplished, for example, via computer or mobile electric device, can cause retraction or extension of the plunger 128 which can push down on or lift the latch-engaging portion 116 of the locking structure 106. In the embodiments shown in FIG. 1, the latch-engaging portion 116 can be biased in a "locked" (lowered) or "unlocked" (raised) position by a biasing mechanism 132, such as a spring or other resilient body, so that absent force applied by the plunger 128, the latch-engaging portion 116 will move to a specific position.

Many different biasing configurations of the actuator 124 and the latch-engaging portion 116 of the locking structure 106 are possible utilizing embodiments of the present invention. For example, in some embodiments, the actuator 124 is a solenoid configured such that application of electrical power causes the plunger 128 to extend and absence of power causes the plunger 128 to retract. In other embodiments, the actuator 124 is a solenoid configured such that application of electrical power causes the plunger 128 to retract and absence of power causes the plunger 128 to extend. In some embodiments, the latch-engaging portion 116 is biased toward a "locked" position and in others the latch-engaging portion 116 is biased toward an "unlocked" position. By changing these configurations around, a user could configure the lock 100 to be biased toward either a "locked" or "unlocked" configuration as desired.

The locking cylinder 126 can comprise any known manual or key cylinder configuration. In the embodiments shown, operation of the locking cylinder 126 causes mechanical movement of the manual-locking element 134. The manual-locking element 134 is connected to the auxiliary-access portion 118, such that movement of the manual-locking element 134 pushes or pulls against a portion of the auxiliary-access portion 118, which causes the auxiliary-access portion 118 to rotate about the auxiliary-access portion pivot access 122, and causes another portion of the auxiliary-access portion 118 to push or pull against a portion of the latch-engaging portion 116, causing the latch-engaging portion 116 to rotate about the latch-engaging portion pivot axis 120, moving the lock into a "locked" or "unlocked" state.

While the disclosure above sets forth examples utilizing locking cylinders and actuators, it is understood that manual access can be provided to the locking structure 106, for example, by having a hole or entry window on one side of the structures 108, 110, for example, the interior to a building such that a user could interact with the locking structure 106 with his or her finger, for example, removing the locking structure 106 from the recess 114 or placing the locking structure 106 into the recess 114. Any configuration allowing for access and movement of the locking structure 106 to enable engaging and disengaging from the latching structure 104 is within the scope of the present disclosure.

The locking component 102 can further comprise a locking mechanism mounting body 136, which can serve as a housing for the locking structure 106 and can comprise the cavity 111 configured to accept the latching component 104. The locking mechanism mounting body 136 can comprise any shape suitable for housing the locking structure 106 and accepting the latching component 104, including any regular or irregular polygonal shape.

In some embodiments, the locking component 102 can further comprise one or more switches 138 (one shown). The switches 138 can be configured to allow for additional manual control over the locking structure 106, for example, allowing a user to flip a switch to control the actuator 124 or to manually move the latch-engaging portion 116 or the auxiliary-access portion 118.

Figure 2:
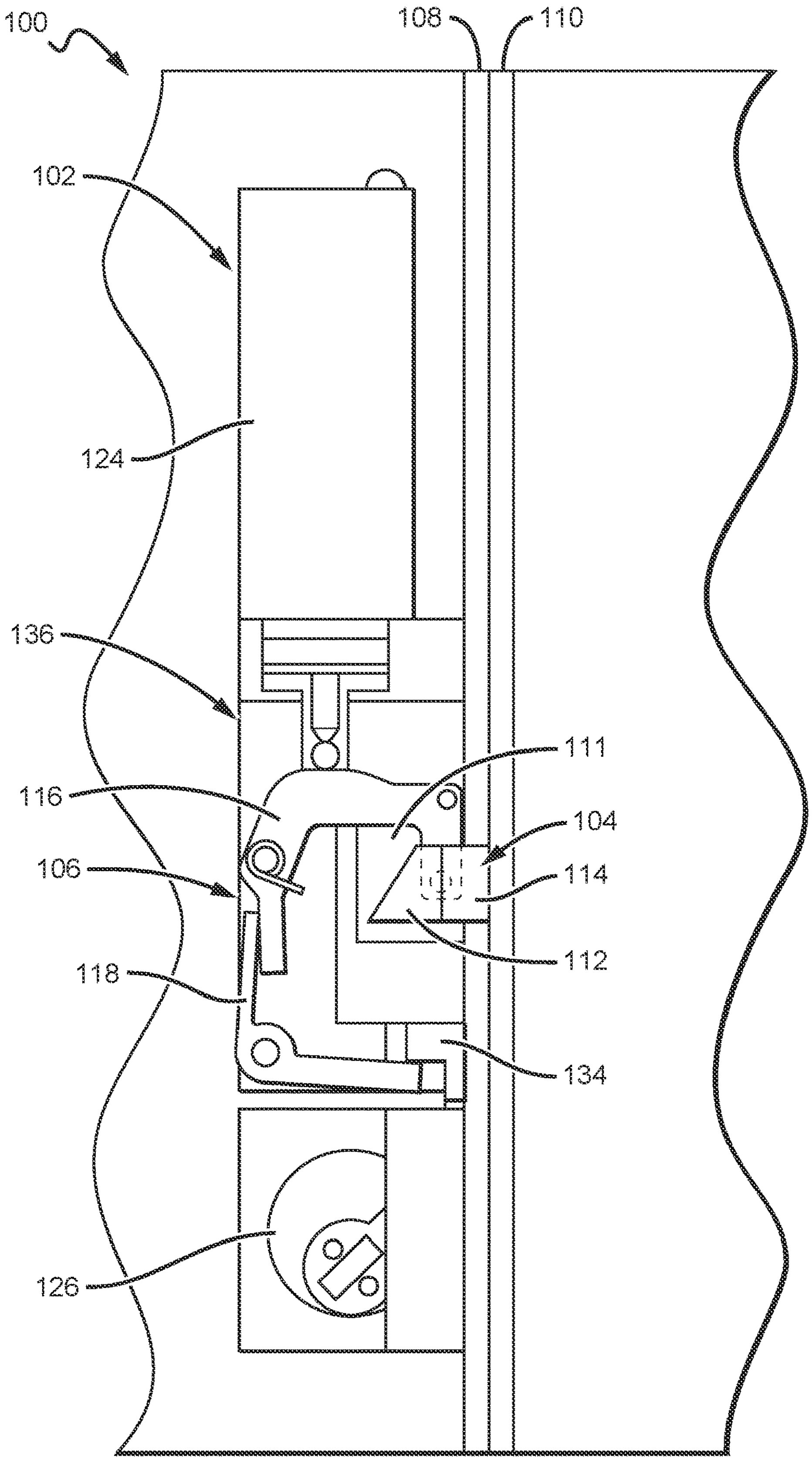
FIG. 2 is a front sectional view of the embodiment of FIG. 1, shown in its "locked" configuration.

Thus far, various features according to the present disclosure have been described with reference to the "unlocked" configuration of the lock 100 shown in FIG. 1. FIG. 2 shows the lock 100 in its "locked" configuration. Like in FIG. 1, FIG. 2 shows the lock 100, the locking component 102, latching component 104, locking structure 106, the first structure 108, the second structure 110, the cavity 111 in the locking component 102, the solid latch structure 112 of the latching component 104, the recess 114 in the latching component 104, the latch-engaging portion 116 of the locking structure 106, the auxiliary-access portion 118 of the locking structure 106, the actuator 124, the locking cylinder 126, the manual-locking element 134 and the locking mechanism mounting body 136.

When in the locked position as shown in FIG. 2, the lock 100 is configured such that the latch-engaging portion 116 of the locking structure 106 is at least partially within the recess 114 of the latching component 104. Also, as can be seen in FIG. 2, the locking cylinder 126 has been operated such that the manual-locking element 134 is extended and not pulling or pushing a portion of the auxiliary-access portion 118, as shown in FIG. 1. This results in the auxiliary-access portion 118 not pushing against, and causing the rotation of, the latch-engaging portion 116, therefore resulting in the latch-engaging portion 116 being in the "locked" position.

Figure 3:
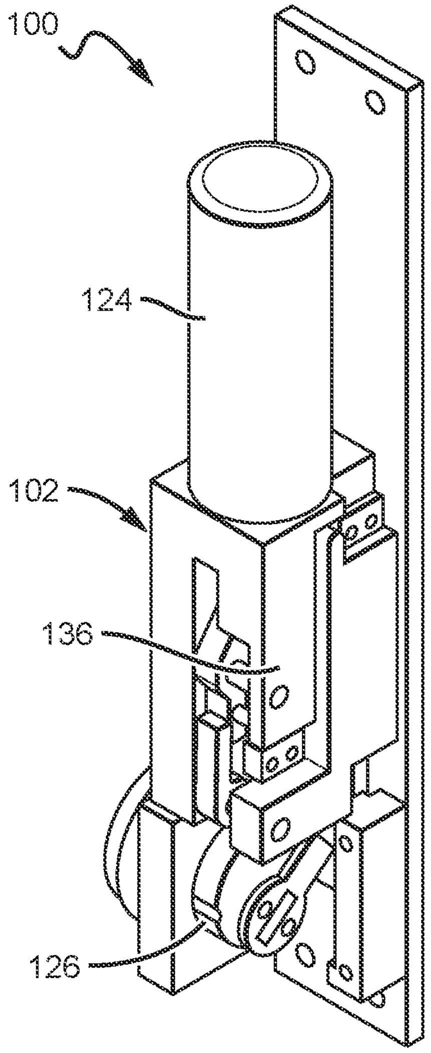
FIG. 3 is a front perspective view of the embodiment of FIG. 2.

The locking mechanism mounting body 136 can be at least partially sealed, as is shown in FIG. 3, so as to better protect the internal components, such as the locking structure 106, from environmental damage. FIG. 3 shows an external perspective view of the lock 100 in the "locked" configuration of FIG. 2, showing the locking component 102, the actuator 124, the locking cylinder 126, and the locking mechanism mounting body 136, wherein the locking mechanism mounting body 136 is covering many of the other internal components.

Figure 4:
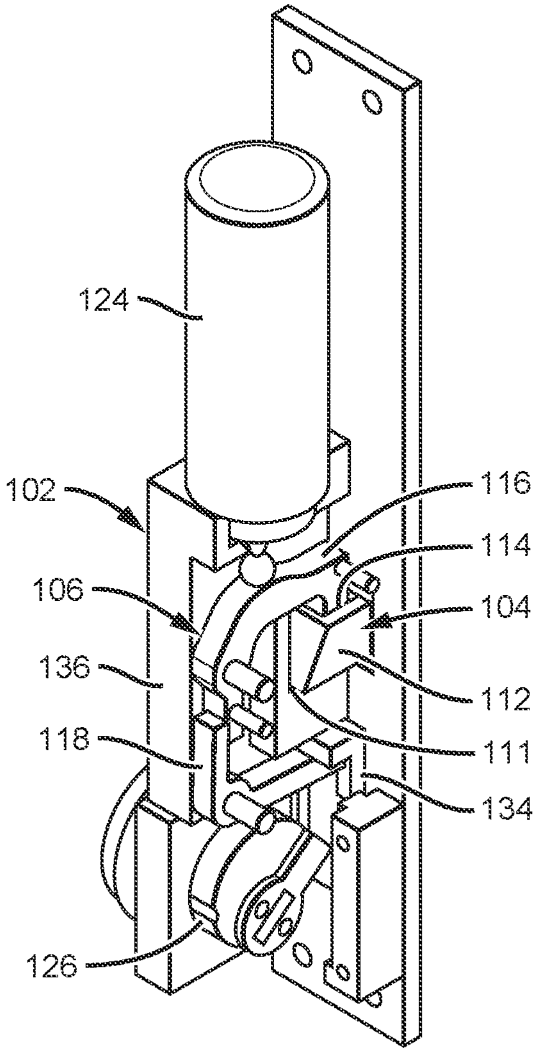
FIG. 4 is a front perspective view of the embodiment of FIG. 2, shown with a portion removed to show internal features.

An "open" perspective view, with part of the locking mechanism mounting body 136 removed to better view the various internal components, is shown in FIG. 4. FIG. 4 shows the lock 100 comprising the locking component 102, latching component 104, locking structure 106, the cavity 111 in the locking component 102, the solid portion 112 of the latch structure 104, the recess 114 in the latch structure 104, the latch-engaging portion 116 of the locking structure 106, the auxiliary-access portion 118 of the locking structure 106, the actuator 124, the locking cylinder 126, the manual-locking element 134 and the locking mechanism mounting body 136. As shown in FIG. 4, the recess 114 in the recess 114 is surrounded by solid sidewalls, so as to substantially surround the sides of the latch-engaging portion 116.

Figure 5:
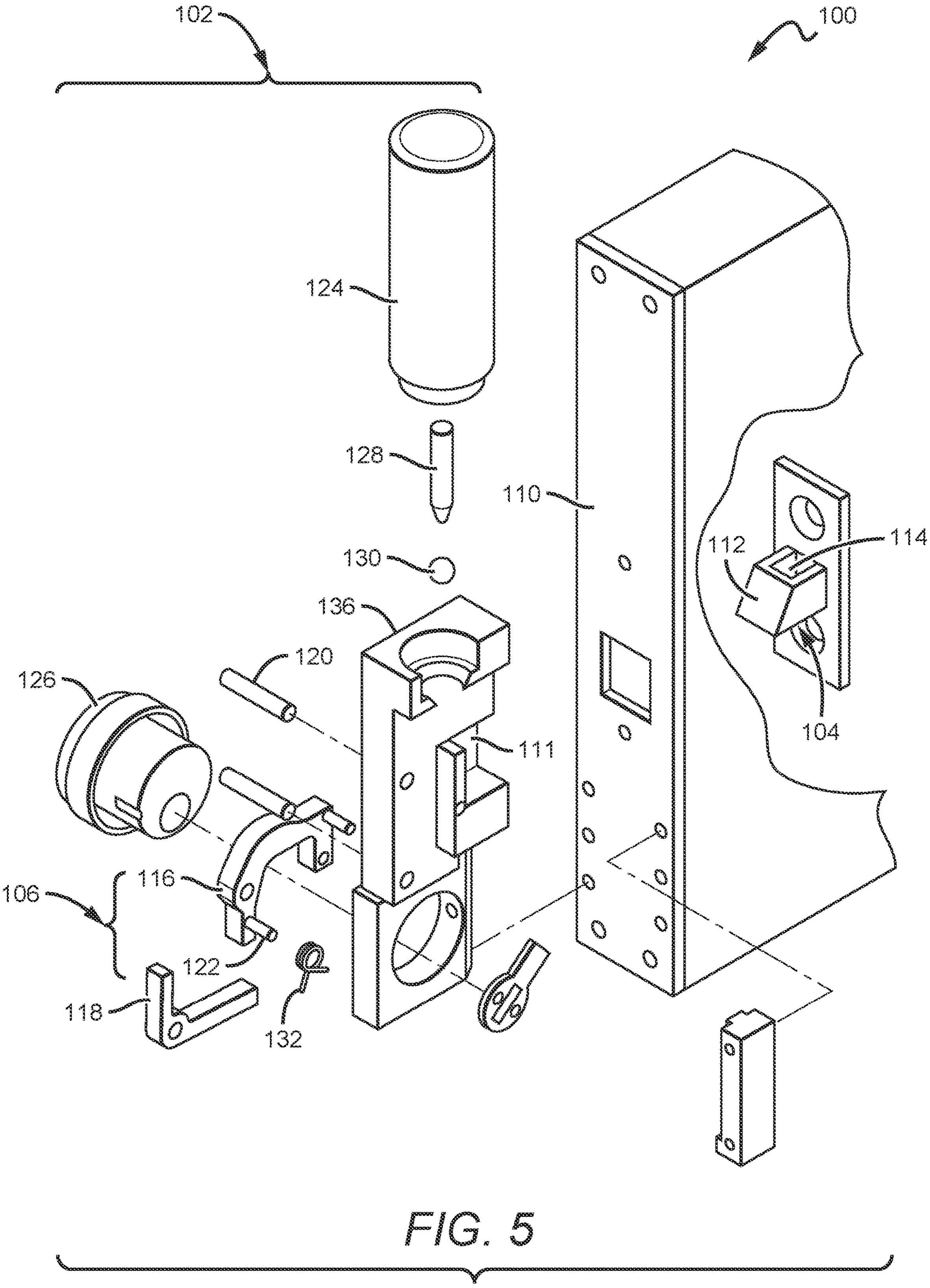
FIG. 5 is an exploded view of the embodiment of FIG. 1.

An exploded view showing some of the various features described herein fitting together is shown in FIG. 5, showing the lock 100 comprising the locking component 102, latching component 104, locking structure 106, the second structure 110, the cavity 111 in the locking component 102, the solid portion 112 of the latch structure 104, the recess 114 in the latch structure 104, the latch-engaging portion 116 of the locking structure 106, the auxiliary-access portion 118 of the locking structure 106, the latch-engaging portion pivot axis 120, the auxiliary-access portion pivot access 122, the actuator 124, the plunger 128, the ball-element 130, the locking cylinder 126, the biasing mechanism 132, the manual-locking element 134 and the locking mechanism mounting body 136. The first structure is not shown in FIG. 5.

The auxiliary-access portion pivot access 122 can be integrated into or connected to the latch-engaging portion 116 of the locking structure 106 as shown in FIG. 5. This allows for rotation of the auxiliary-access portion 118, while still enabling the latch-engaging portion 116 to rotate on its own via the latch-engaging portion pivot axis 120, for example, in response to application or cessation of force from the plunger 128 connected to the actuator 124 as described herein.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention as expressed in the appended claims, wherein no portion of the disclosure is intended, expressly or implicitly, to be dedicated to the public domain if not set forth in any claims.

I claim:

1. A locking mechanism, comprising:

a latching component comprising a solid latch structure, said solid latch structure comprising a recess;

a locking component comprising a cavity configured to receive said solid latch structure, said locking component comprising a latch-engaging portion rotatably mounted within said locking configured to rotationally transition between a first position wherein a portion of said latch-engaging portion engages said solid latch structure recess within said cavity, and holds said solid latch structure within said cavity, and a second position wherein said latch-engaging portion does not engage said solid latch structure recess;

an auxiliary-access portion rotationally mounted within said locking component and connected to said latch engaging portion, said auxiliary access portion configured to rotationally transition between first and second positions in response to a mechanical force, wherein said first position causes said latch engaging portion to engage said solid state latch structure and said second position causes said latch engaging portion to disengage from said solid state latch structure; and an actuator operable on said latch-engaging portion to transition said latch engaging portion between said first position and said second position in response to an electrical signal applied to said actuator.

2. The locking mechanism of claim 1, wherein said latching component is configured to be connected to a first structure and said locking component is configured to be connected to a second structure, such that when said latch-engaging portion engages said solid latch structure within said cavity, said first structure is connected to said second structure.

3. The locking mechanism of claim 1, wherein said actuator comprises a solenoid.

4. The locking mechanism of claim 1, wherein said actuator comprises a plunger coupled to said latch-engaging portion.

5. The locking mechanism of claim 4, wherein said actuator comprises a ball-element configured to reduce friction when said plunger interacts with said latch-engaging portion.

6. The locking mechanism of claim 1, further comprising a manual locking cylinder connected to said auxiliary-access portion.

7. The locking mechanism of claim 1, wherein at least a portion of said latch-engaging portion is configured to fit inside said solid latch structure recess when said latch-engaging portion engages said solid latch structure within said cavity.

8. A locking mechanism, comprising:

a latching component comprising a solid latch structure, comprising a recess surrounded by sidewalls;

a locking component comprising an electrically operable actuator and latch-engaging portion rotationally mounted within said locking component, wherein said electrically operable actuator is arranged to operate on said latch-engaging portion to cause rotational transition between a first position wherein a portion of said latch-engaging portion engages said solid latch structure recess and connects said solid latch structure to said latch-engaging portion, and a second position wherein said latch-engaging portion does not engage said receptacle portion of said solid latch structure; and a mechanically operable auxiliary-access portion rotationally mounted within said locking component and connected directly to and operable on said latch-engaging portion, said auxiliary-access portion configured to rotate under a mechanical force to transition first position and second positions, wherein said first position causes said latch engaging portion to engage said solid state latch structure and said second position causes said latch engaging portion to disengage from said solid state latch structure.

9. The locking mechanism of claim 8, wherein said latching component is configured to be connected to a first structure and said locking component is configured to be connected to a second structure, such that when said latch-engaging portion engages said receptacle portion of said solid latch structure, said first structure is connected to said second structure.

10. The locking mechanism of claim 8, wherein said electrically operable actuator comprises a solenoid.

11. A locking mechanism, comprising:

a latching component comprising a solid latch structure, said solid latch structure comprising a receptacle portion, said receptacle portion comprising a recess surrounded by sidewalls;

a locking component comprising a cavity configured to receive a portion of said solid latch structure, said locking component comprising a latch-engaging portion rotationally mounted to said locking component and an auxiliary-access portion rotationally mounted to said locking component and connected directly to said latch-engaging portion, wherein said locking component is configured to electrically and mechanically transition between a first position wherein a portion of said latch-engaging portion engages said solid latch structure recess and holds said solid latch structure within said cavity, and a second position wherein said latch-engaging portion does not engage said solid latch structure recess; and wherein said auxiliary-access portion is rotatable under a mechanical force to mechanically transition said locking component between said first and second positions.

12. The locking mechanism of claim 11, wherein said locking mechanism further comprises an electrically operable actuator configured to transition said latch-engaging portion between said first position and said second position.

13. The locking mechanism of claim 12, wherein said actuator comprises a plunger and a ball-element.

* * * * *